United States Patent [19]

Horii et al.

[11] 4,091,052

[45] May 23, 1978

[54] COATING COMPOSITION

[75] Inventors: Hideo Horii; Yutaka Otsuki, both of Yokohama; Atsushi Kaiya; Yoshihiko Araki, both of Kawasaki, all of Japan

[73] Assignee: Nippon Oil Company Limited, Tokyo, Japan

[21] Appl. No.: 691,969

[22] Filed: Jun. 1, 1976

[30] Foreign Application Priority Data

Jun. 5, 1975 Japan ................................. 50-67087
Jun. 5, 1975 Japan ................................. 50-67088

[51] Int. Cl.$^2$ ............................................C08F 279/02
[52] U.S. Cl. ............................... 260/879; 260/30.4 A; 260/33.2 R
[58] Field of Search .................... 260/879; 526/54, 55, 526/56

[56] References Cited

U.S. PATENT DOCUMENTS

| 3,794,638 | 2/1974 | Westermann | 260/879 |
| 3,925,279 | 12/1975 | Horii | 260/23.7 R |
| 3,974,129 | 8/1976 | De La Mare | 526/56 |

*Primary Examiner*—Paul R. Michl
*Attorney, Agent, or Firm*—Frank J. Jordan

[57] ABSTRACT

A coating composition is disclosed which is curable at room temperature uniformly at and through the surface and inner portions of a film formed upon application of the composition to an article. The coating composition is characterized by the combination with a starting butadiene polymer (to which an acid is added) of a poly-(metha)-acrylate of a polyhydric alcohol, at least one of the compounds which have an allyl ether group, a tetrahydrofurfuryl group or a benzyl ether group, a radical generator and, if desired, a pigment.

10 Claims, No Drawings

4,091,052

COATING COMPOSITION

BACKGROUND OF THE INVENTION

This invention relates to coating compositions, more particularly to such coating compositions containing principally polybutadienes which can be cured to increased thickness at room temperature.

Generally, coatings are desirably such which can produce a desired thickness of film with less frequency of coating application. On the other hand, they should preferably be liquids of low viscosity to facilitate the coating operation.

Both of these features or requirements cannot be achieved by any known solvent-containing coating for the simple reason that the use of increased portions of solvents to lower the viscosity of the coating would result in failure to obtain sufficiently great film thickness and for another contradicting reason that the use of less solvents with a view to increasing the concentration of the coating might contribute to the thickness of coated film but would unduly increase the viscosity and hence would run counter to the ease of coating operation.

There are also known certain non-solvent type coatings comprising unsaturated polyesters and copolymerizable monomers such as styrene, which coatings could meet with the aforesaid requirements to some extent, but have a drawback in that the curing of the surface of coated film is interfered with by oxygen in the atmosphere, resulting in sticky surface finish. Another difficulty of the conventional non-solvent coatings is that their film has rather poor resistance to water and acids.

SUMMARY OF THE INVENTION

It is an object of the present invention to provide an improved coating composition which is capable of producing a coated film curable at room temperature to increased thickness with low viscosity.

It is another object of the invention to provide a coating composition which can produce a film excellent in surface gloss, strength and fixation and further in water-resistance, corrosion-resistance and chemicals-resistance.

The foregoing objects of the invention can be achieved by the provision of a coating composition which comprises:
(a) the reaction product of a butadiene polymer having a number average molecular weight of 500 – 10,000, more than 50% of the butadiene units in the polymer chain being linked in 1,2-bonds, and 0.02 – 0.3 mol of an unsaturated dicarboxylic acid or its anhydride per 100 grams of said polymer;
(b) a poly-(metha)-acrylate of a polyhydric alcohol;
(c) at least one compound of the class consisting of compounds having an allyl ether group, compounds having a tetrahydrofurfuryl group and compounds having a benzyl ether group;
(d) a radical generator; and
(e) if desired, a pigment.

The invention will be better understood from the following detailed description of certain preferred embodiments which the invention may assume in practice.

DETAILED DESCRIPTION OF THE PREFERRED EMBODIMENTS

It is known in the art to prepare a coating from liquid butadiene polymers as a starting material having a relatively low molecular weight, the coating being applied to form a film about 10 – 30 microns thick and printed at elevated temperature. Such coating has found extensive use particularly in electro-deposition for its excellent resistance to water, to corrosion and to chemicals.

Curing of a film of electro-deposition coating is effected at highly elevated temperature by an oxidation polymerization in the air, in which instance the curing or hardening of the coated film starts from the surface and hence the inner parts of the film are difficult to get cured where its thickness is increased. Conventional electro-deposition coatings are therefore limited as regards the thickness of their film which can be obtained and are usually applicable to film thicknesses not exceeding 30 microns. Furthermore, such relatively thin film of coating is rather slow in curing at around room temperature.

Various attempts have been made to harden liquid butadiene polymers at low or room temperature; for example, there is known a process (as disclosed in Japanese Pat. Publication No. 46-32419) for curing a mixture of liquid 1,2-polybutadienes and esters of fumaric acid and acrylic acid in the presence of organic peroxides, or another process for curing a mixture of maleinized liquid polybutadienes and alpha, beta-ethylenic unsaturated compounds such as methyl methacrylate in the presence of organic peroxides (see Japanese Pat. Publication No. 47-36865). The curing of these mixtures takes place in the inner region of the coating by a radical polymerization, but this polymerization is interfered with by oxygen in the air with the result that the surface of the coated film remains sticky.

It has now been found that by blending the above described components (b) and (c) with a starting material (a) i.e. a liquid polybutadiene having an acid added thereto, there can be obtained a film of coating which is curable uniformly at both the surface and the inner parts thereof, without encounting objectionable surface stickiness. While it is not completely clear how the surface of the coated film can be well cured according to the process of the invention wherein the curing depends upon a radical polymerization, it is believed that the various components of the coating composition interact with each other so as to eliminate the interference of oxygen in the air.

The present inventors have previously introduced a coating composition of the type which is curable at room temperature and which essentially comprises a maleinized liquid polybutadiene, a drying or semi-drying oil modified alkyd resin, a polyfunctional vinyl monomer, a ketone peroxide and a heavy metal salt of carboxylic acid. A patent application for this composition has now matured into U.S. Pat. No. 3,925,279. Continued research has later revealed that the above patented product has improvements in regard to surface curing and adhesion of a coated film, but suffers from somewhat declined resistance to water, alkali and corrosion.

The present invention is therefore directed to the improvement in respect of water resistance and chemicals-resistance of the aforesaid patented product.

The term butadiene polymers, i.e., component (a) designates butadiene alone or polymers resulting from the polymerization or copolymerization of comonomers copolymerizable with butadiene. Preferred examples of these comonomers are aliphatic conjugated diolefins having a carbon number of 5 – 12 such as isoprene and piperylene, and vinyl-aromatic compounds having a carbon number of 8 – 20 such as styrene, alphamethylstyrene and vinyltoluene. The amount of these comonomers to be used should preferably be less than 50 mol percent with respect to butadiene.

The butadiene polymers according to the invention are normally liquid at room temperature and should have a number average molecular weight of 500 – 10,000, preferably 1,000 – 5,000. Repeated experiments have indicated that number average molecular weights of less than 500 would result in retarded curing rate and mechanically weak film of coating, while those of more than 10,000 would increase the viscosity of the coating to an objectionable extent such that prohibitive quantities of solvents are required. 50 percent, preferably 70 percent of butadiene units in the butadiene polymer chain should be linked in 1,2-bonds. Less than 50 percent of 1,2-bonds would reduce the cross-linking density of the butadiene, resulting in decreased hardness and strength of a coated film.

The butadiene polymers employed in accordance with the present invention are preferably prepared by the chain transfer anion polymerization in which metallic sodium or organo-sodium is used as a catalyst (see U.S. Pat. No. 3,789,090), or by the living polymerization in which butadiene is added to a system containing Lewis bases such as tetrahydrofuran and alkali metals such as sodium in the presence of an activator which is an organic hydrocarbon such as naphthalene (see Japanese Pat. Publication Nos. 42-17485 and 43-27432), or by the polymerization which is effected in the presence of aromatic hydrocarbon solvents such as toluene and xylene and dispersants such as sodium, with esters such as dioxane added to control the molecular weight of the resulting polymer (see Japanese Pat. Publication Nos. 32-7446, 33-1245 and 34-10188).

According to an important aspect of the invention, the butadiene polymer is added with an unsaturated dicarboxylic acid or its anhydrides, the amount of the latter being of the order of 0.02 – 0.3 mol per 100 grams of the polymer. Esterified compounds of such polymer may also be used. The unsaturated dicarboxylic acid should have a carbon number of 4 – 20, examples of which are maleic acid, fumaric acid, citraconic acid, itaconic acid and their anhydrides, and should preferably have alpha, beta-ethylenic unsaturated groups. It has been found that maleic acid is the best amongst those listed. The acid-added butadiene polymer according to the invention may be prepared by any known addition reaction in which the butadiene polymer is reacted with the aforementioned unsaturated dicarboxylic acid or its anhydride at a temperature ranging from 100° C to 300° C in the presence or absence of solvents. It has been found preferable to effect the addition reaction in the presence of phenylene diamines, pyrogallols, naphthol or the like (see German Laid-Open Publication No. 2,362,534). The acid-added butadiene polymer may also be esterified with monoalcohol in the presence of known acid catalysts. The monoalcohol includes aliphatic or aromatic alcohols normally having a carbon number of 1 – 20 such as methanol, ethanol, ethyleneglycol monomethyl ether, ethyleneglycol mono-n-butyl ether, benzyl alcohol and lauryl alcohol.

The amount of unsaturated dicarboxylic acid or its anhydride to be added should be in the range of 0.02 – 0.3 mol, preferably 0.05 – 0.2 mol per 100 grams of butadiene polymer. Less than 0.02 mol acid would result in incompatibility of the components (b) and (c), which whould in turn affect adhesion of the coating to an article and wettability of the coating with pigments. More than 0.3 mol acid would enhance the adhesion of a coated film but conversely increase the viscosity of the resin to an objectionable extent.

The poly-(metha)-acrylate of polyhydric alcohol, which is the component (b) of the coating composition according to the invention, is a polyfunctional ester compound having at least two acrylic acid or methacrylic acid ester-bonded to at least two hydroxyl groups in one molecule of the polyhydric alcohol. The term polyhydric alcohol includes preferably ethleneglycol, propyleneglycol, triethyleneglycol, trimethylolpropane, pentaerythritol or the like which is an aliphatic polyhydric alcohol normally having a carbon number of 2 – 20, and polyalkyleneoxide glycol such as polyethylene glycol and polypropylene glycol.

Preferred examples of the above component (b) are ethyleneglycol diacrylate, ethyleneglycol dimethacrylate, diethyleneglycol diacrylate, diethyleneglycol dimethacrylate, triethyleneglycol diacrylate, triethyleneglycol dimethacrylate, and trimethylolpropane trimethacrylate.

There is no particular limitation imposed upon the amount of the component (b), but it may usually be in the range of 5 – 100 preferably or 10 – 80, weight parts per 100 weight parts of the acid-added butadiene polymer.

The component (b) functions as one of the curing resins at the time a film of coating is formed and further serves to regulate the viscosity of the coating as well as to improve the compatibility of the component (c) with the acid-added butadiene polymer (a). Experiments have indicated that these advantages of the component (b) can be sacrificed if its amount is less than 5 weight parts, while greater than 100 parts would reduce the chemicals-resistance of the coating and are literally not economically feasible. Monomers or polyfunctional monomers such as divinyl benzene and diallyl phthalate other than the above identified poly-(metha)-acrylates of polyhydric alcohol are not suitable for the purpose of the invention, because coatings prepared from such monomers are extremely slow in curing at room temperature and difficult to form a film of a desired thickness, and furthermore the film is less flexible.

The component (c) of the coating composition provided in accordance with the invention is a compound having an allyl ether group, which compound is represented by the general formula:

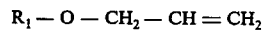

where $R_1$ is an organic residue having a carbon number of 1 – 20 which does not react per se or with the other components of the coating composition with any objectional results. Typical preferred examples of the component (c) are glycerol monoallyl ether, glycerol diallyl ether, trimethylolpropane monoallyl ether, trimethylolpropane diallyl ether, allyl ethyleneglycol monoethyl ether and allyl glycidyl ether.

Another compound constituting the component (c) is one having a tetrahydrofurfuryl group and represented by the general formula:

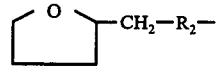

where $R_2$ is a hydroxyl group or an organic residue having a carbon number of 1 - 20. Typical examples are tetrahydrofurfuryl alcohol and organic acid esters thereof.

Still another compound which can be alternatively used as the component (c) is one having a benzyl ether group and represented by the general formula:

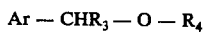

where Ar is an aromatic nucleus, and $R_3$ and $R_4$ both are an organic residue having a carbon number of 1 - 20. Preferred examples are propane monobenzyl ether and benzyl ethyleneglycol monoethyl ether.

Each of the above components (c) may be added in amounts of 1 - 50, preferably 5 - 30 parts by weight per 100 parts by weight of the acid-added butadiene polymer. Each component (c) functions to expedite the curing of a coated film and further serves to regulate the viscosity of the coating composition.

Alternatively, there may be used a mono-(metha)-acrylate of a polyhydric alcohol as the component (c) which is a monofunctional ester compound having acrylic acid or methacrylic acid ester-bonded to only one of the hydroxyl groups in one molecule of the polyhydric alcohol. Preferred examples of such component are ethyleneglycol monoacrylate, ethyleneglycol monomethacrylate, diethyleneglycol monoacrylate, diethyleneglycol monomethacrylate, triethyleneglycol monoacrylate, triethyleneglycol monomethacrylate, trimethylolpropane monoacrylate and trimethylolpropane monomethacrylate. For satisfactory results, the mono-(metha)-acrylate just mentioned may be used in amounts of 5 - 100, preferably, 10 - 80 weight parts per 100 weight parts of the acid-added butadiene polymer.

It has now been found that the component (c) adds to the curing of a coated film particularly at the surface region. As hereinafter described in connection with the Inventive Examples as compared with the Comparative Examples, the curing of a film of coating at room temperature takes only about two hours by virtue of the component (c), whereas it takes as long as twenty four hours were it not for the component (c). This advantage of the component (c) would be nil if it was used in amounts less than 1 weight part. On the other hand, 50 weight parts or greater amounts of the component (c) would conversely result in reduced resistance to chemicals and poor compatibility with the other components. Needless to mention, such unnecessarily large amounts of the component (c) are economically infeasible.

Other monomers than the above specified components (c) such as monofunctional vinyl monomers including styrene and methyl methacrylate are not suitable for the purpose of the invention, because coatings prepared with use of such monofunctional monomers are difficult to cure at room temperature or, should they be cured at room temperature it would take increased length of time and the resulting film would not be sufficiently strong.

The radical generator or component (d) may be of any known type, and may be used alone or in combination. It is preferable to use such radical generators which can diminish within two hours at 15° C. Longer diminishing periods cannot impart sufficient curing ability at room temperature to coating compositions. The radical generator (d) may be added in amounts of 0.1 to 15 weight parts per 100 weight parts of the acid-added butadiene polymer, with satistactory results.

Preferred examples of the radical generator according to the invention are ketone peroxides such as methylethylketone peroxide, cyclohexane peroxide, acetylacetone peroxide and mixtures thereof with heavy metal salts of organic carboxylic acid such as cobalt naphthenate, manganese naphthenate, zinc naphthenate, cobalt octylate and cobalt stearate.

It has been found more preferable to combine about 0.01 - 5 weight parts of cobalt salt amongst other heavy metal salts with about 1 - 10 weight parts of any of the above ketone peroxides. In which instance, the heavy metal salts of organic carboxylic acid serve to promote the radical generation from the peroxides and also to improve the hardness, surface curing and other properties of a coated film. If desired, there may be used suitable pigments in amounts not exceeding 500 weight parts, preferably of about 50 - 400 weight parts per 100 weight parts of the acid-added butadiene, thereby imparting an aesthetic value or colors to the resulting film of coating and also preventing dripping of the coating.

The pigments under contemplation may be any ordinary pigments known for use in coatings, and they may be naturally occuring, or synthetically organic or inorganic. Examples of such inorganic pigments are titania, bengal, carbon black, chrome yellow and white lead. Examples of organic pigments are of the class of azo, anthraquinone, quinoline and phthalocyanine.

In the practice of the invention, the coating composition is maintained in two separate liquids. In other words, the radical generator alone may be blended with the other components immediately before the coating composition is applied to an article. In such instance, the radical generator may be dissolved beforehand in a small amount of solvent.

Advantageously, the coating compositions of the present invention are relatively low in viscosity and hence can be applied to form a film about 150 microns thick only at a time without solvents. If desired, suitable solvents may also be used.

The coating compositions of the invention may also have added thereto organic solvents, dispersants, wetting agents, antifoaming agents, precipitation inhibitors, antistatic agents or other additives which are usually contained in coatings.

The following examples are provided to further illustrate the coating compositions of the present invention, but these are not to be regarded as limiting. The term parts appearing in the examples is parts by weight unless noted otherwise.

The physical properties of a film of coating obtained in accordance with the examples below are determined by the following testing procedures:

(1) Pencil hardness: JIS-K-5400, scratching with load of 1 kg.

(2) Dupont's impact test: 1/2 inch. 500 grams.

(3) Ericksen test: JIS-K-5400, three-dimensional deformation of coated film.

(4) Cross-cut test: 1 m × 1 m.

(5) Corrosion test: Coated film is cross cut according to JIS-Z-2371 and sprayed with 5% NaCl solution, and thereafter disposed at 35° C for 300 hours.

(6) Alkali-resistance test: Coated film is immersed in 5% NaOH solution at room temperature and is checked at intervals for any abnormal changes.

(7) Water-resistance test: Coated film is immersed in purified water of 40° C for 40 days and thereafter subjected to cross-cut test.

The amount of acid added to butadiene polymer is represented by acid value obtainable from the following formula:

Amount of acid (mol per 100 grams polybutadiene) = acid value × 53/56 × 100 × $10^{-3}$

INVENTIVE EXAMPLE 1

A steel plate was coated by 10 mil applicator with a mixture consisting of 80 parts maleinized liquid polybutadiene containing 0.095 mol of maleic acid anhydride per 100 grams of polybutadiene, and having an acid value of 53 prepared by the reaction of liquid polybutadiene having 63% 1,2-bonds and a number average molecular weight of 1,500 with maleic acid anhydride at 200° C for 3 hours, 10 parts ethyleneglycol dimethacrylate, 10 parts tetrahydrofurfuryl alcohol, 80 parts titania, 1 part cobalt naphthenate containing 6% cobalt and 2.5 parts methylethylketone peroxide. The coating thus applied was cured at room temperature. The coated film required 3 hours to be tack free and 6 hours to be completely cured.

The cured film had a thickness of 130 microns and showed excellent physical properties including a pencil hardness of 2H, a Dupont's impact test value of above 50 cm and an Ericksen test value of 7.5 mm. The film withstood a cross cut test with satisfactory results. The film was subjected to a corrosion test, and after a lapse of 200 hours the same did not show any objectionable change. Water resistance test was made of the film of coating at 40° C over a time length of 400 hours with satisfactory results. No objectionable changes were noted in the film upon soaking of the same in 5% NaOH solution at room temperature for a duration of 24 hours.

COMPARATIVE EXAMPLE 1

A steel plate was coated by 10 mil applicator with the same mixture as in Inventive Example 1 except for the use of methylmethacrylate instead of the ethyleneglycol dimethacrylate and the tetrahydrofurfuryl alcohol. The coating thus applied was cured at room temperature. The coated film required 30 hours to be tack free and 72 hours to be completely cured. The cured film had a thickness of 110 microns and showed a pencil hardness of B, a Dupont's impact test value of 20 cm and an Ericksen test value of 3 mm, and could not withstand a cross cut test. A corrosion test, water resistance test and alkaline test was made of the film of coating with unsatisfactory results.

COMPARATIVE EXAMPLE 2

A steel plate was coated by 10 mil applicator with the same mixture as in Inventive Example 1 except for the use of maleinized liquid polybutadiene having an acid value of 55 prepared by the reaction of liquid polybutadiene having 80% cis-1,4-bonds, 20% trans-1,4-bonds and a number average molecular weight of 1750 with maleic acid anhydride at 200° C for 3 hours instead of the maleinized liquid polybutadiene. The coating thus applied was cured at room temperature. However, the film was not cured even after a lapse of 24 hours.

INVENTIVE EXAMPLE 2

A steel plate was coated by 10 mil applicator with a mixture consisting of 80 parts maleinized liquid polybutadiene having an acid value of 10 prepared by the addition of maleic acid anhydride to liquid polybutadiene having 73% 1,2-bonds and a number average molecular weight of 3,600 in the same procedure as in Inventive Example 1, 10 parts trimethylolpropane trimethacrylate, 10 parts glycerol monoallyl ether, 80 parts titania, 1 part cobalt naphthenate containing 6% cobalt and 2.5 parts methylethyketone peroxide. The coating thus applied was cured at room temperature. The coated film required 2.5 hours to be tack free and 5 hours to be completely cured. The cured film had a thickness of 130 microns and showed excellent physical properties including a pencil hardness of 4H, a Dupont's impact test value of above 50 cm and an Erickson test value of 8 mm. The film withstood a cross cut test with satisfactory results.

INVENTIVE EXAMPLE 3

A steel plate was coated by 10 mil applicator with a mixture consisting of 80 parts maleinized liquid polybutadiene having an acid value of 70 prepared by the addition of maleic acid anhydride to liquid polybutadiene having 58% 1,2-bonds and a number average molecular weight of 790 in the same procedure as in Inventive Example 1, 20 parts ethyleneglycol diacrylate, 10 parts benzyl ethyleneglycol monoethyl ether, 80 parts titania, 1 part cobalt octoate containing 6% cobalt and 3 parts cyclohexane peroxide. The coating thus applied was cured at room temperature. The coated film required 3 hours to be tack free and 6 hours to be completely cured. The cured film had a thickness of 130 microns and showed excellent physical properties including a pencil hardness of H and a Dupont's impact test value of 30 cm. The film withstood a cross cut test with satisfactory results.

INVENTIVE EXAMPLE 4

A steel plate was coated by 10 mil applicator with a mixture consisting of 70 parts maleinized liquid polybutadiene having an acid value of 54 prepared by the addition of maleic acid anhydride to liquid polybutadiene having 60% 1,2-bonds and a number average molecular weight of 1020 in the same procedure as in Inventive Example 1, 15 parts triethyleneglycol dimethacrylate, 15 parts allyl glycidyl ether, 80 parts titania, 1 part cobalt naphthenate containing 6% cobalt and 2.5 parts methylethylketone peroxide. The coating thus applied was cured at room temperature. The coated film required 2.5 hours to be tack free and 4 hours to be completely cured.

The cured film had a thickness of 130 microns and showed excellent physical properties including a pencil hardness of 2H and a Dupont's impact test value of 40 cm. The film withstood a cross cut test with satisfactory results.

COMPARATIVE EXAMPLE 3

A steel plate was coated by 10 mil applicator with a mixture consisting of 70 parts of the same maleinized liquid polybutadiene as used in Inventive Example 4, 30 parts triethyleneglycol dimethacrylate, 80 parts titania, 1 part cobalt naphthenate containing 6% cobalt and 2.5 parts methylethylketone peroxide. The coating thus applied was cured at room temperature. The coated film required 12 hours to be tack free and 24 hours to be completely cured.

INVENTIVE EXAMPLE 5

A steel plate was coated by 10 mil applicator with a mixture consisting of 70 parts maleinized liquid polybutadiene having an acid value of 20 prepared by the addition of maleic acid anhydride to liquid polybutadiene having 73% 1,2-bonds and a number average molecular weight of 3600 in the same procedure as in Inventive Example 1, 20 parts diethyleneglycol dimethacrylate, 10 parts trimethylolpropane diallyl ether, 80 parts titania, 1 part cobalt naphthenate containing 6% cobalt and 2.5 parts methylketone peroxide. The coating thus applied was cured at room temperature. The coated film required 1 hour to be tack free and 2 hours to be completely cured. The cured film had a thickness of 50 microns and showed excellent physical properties including a pencil hardness of 4H, a Dupont's impact test value of above 50 cm and an Ericksen test value of 8.5 mm. The film withstood a cross cut test with satisfactory results. The film was subjected to a water resistance test and after a lapse of 300 hours at ordinary temperature no objectionable changes were noted in the film.

INVENTIVE EXAMPLE 6

A steel plate was coated by 10 mil applicator with a mixture consisting of 60 parts maleinized liquid polybutadiene having an acid value of 80 prepared by the addition of maleic acid anhydride to liquid polybutadiene having 60% 1,2-bonds and a number average molecular weight of 1020 in the same procedure as in Inventive Example 1, 30 parts trimethylolpropane triacrylate, 10 parts allyl ethyleneglycol monoethyl ether, 80 parts titania, 1 part cobalt naphthenate containing 6% cobalt and 3 parts methylethylketone peroxide. The coating thus applied was cured at room temperature. The coated film required 2 hours to be tack free and 4 hours to be completely cured. The cured film had a thickness of 150 microns and showed excellent physical properties including a pencil hardness of 3H, a Dupont's impact test value of 50 cm and an Ericksen test value of 7 mm.

INVENTIVE EXAMPLE 7

A steel plate was coated by 10 mil applicator with a mixture consisting of 70 parts maleinized liquid polybutadiene having an acid value of 60 prepared by the addition of maleic acid anhydride to liquid polybutadiene having 90% 1,2-bonds and a number average molecular weight of 2000 in the same procedure as in Inventive Example 1, 20 parts diethyleneglycol diacrylate, 10 parts trimethylolpropane monobenzyl ether, 50 parts titania, 1 part cobalt naphthenate containing 6% cobalt and 2 parts methylethylketone peroxide. The coating thus applied was cured at room temperature. The coated film required 2.5 hours to be tack free and 5 hours to be completely cured. The film of coating with toughness was obtained.

INVENTIVE EXAMPLE 8

Maleinized liquid polybutadiene having an acid value of 40 was prepared by the addition of maleic acid anhydride to liquid polybutadiene having 68% 1,2-bonds and a number average molecular weight of 2500 in the same procedure as in Inventive Example 1.

A steel plate was coated to a thickness of 1 mm with a mixture consisting of 80 parts esterified polybutadiene prepared by the esterification of said maleinized liquid polybutadiene with butyl ethyleneglycol monoethyl ether in a conventional manner, 50 parts triethyleneglycol diacrylate, 30 parts glycerol diallyl ether, 100 parts titania, 3 parts cobalt naphthenate containing 6% cobalt and 5 parts methylethylethylketone peroxide. The resulting relatively thick film of coating was rapidly cured at room temperature and its surface required only 2 hours to be completely cured.

INVENTIVE EXAMPLE 9

A steel plate was coated by 10 mil applicator with a mixture consisting of 100 parts maleinized liquid polybutadiene having an acid value of 40 prepared by the addition of maleic acid anhydride to liquid polybutadiene having 63% 1,2-bonds and a number average molecular weight of 1500 in the same procedure as in Inventive Example 1, 60 parts ethyleneglycol dimethacrylate, 20 parts trimethylolpropane monoallyl ether, 130 parts titania, 3 parts cobalt naphthenate containing 6% cobalt and 4 parts methylethylketone peroxide. The coating thus applied was cured at room temperature. The coated film required 3 hours to be tack free and 6 hours to be completely cured. The cured film had a thickness of 130 microns and showed excellent physical properties including a pencil hardness of 2H, a Dupont's impact test value of 50 cm and an Ericksen test value of 7.5 mm.

INVENTIVE EXAMPLES 10 – 14 AND COMPARATIVE EXAMPLES 4 AND 5

A steel plate treated with zinc phosphate was coated by 10 mil applicator with a mixture consisting of 70 parts maleinized liquid polybutadiene having an acid value of 80 prepared by the addition of maleic acid anhydride to liquid polybutadiene having 65% 1,2-bonds and a number average molecular weight of 2000 in the same procedure as in Inventive Example 1, 80 parts titania, 5 parts strontium chromate, 5 parts cobalt naphthenate containing 6% cobalt, 5 parts methylethylketone peroxide, ethyleneglycol dimethacrylate and tetrahydrofurfuryl alcohol, the added amounts of the ethyleneglycol dimethacrylate and the tetrahydrofurfuryl alcohol being varied as shown in Table 1. The coating thus applied was cured at room temperature. The results of these tests are given in Table 1.

It will be seen from Table 1 that less ethyleneglycol dimethacrylate results in reduced hardness of the film and reduced chemicals-resistance, and that less tetrahydrofurfuryl alcohol results in retarded curing rate.

INVENTIVE EXAMPLE 15

A steel plate was coated by 10 mil applicator with a mixture consisting of 80 parts maleinized liquid polybutadiene containing 0.095 mol of maleic acid anhydride per 100 grams of polybutadiene, and having an acid value of 53 prepared by the reaction of liquid polybutadiene having 63% 1,2-bonds and a number average molecular weight of 1500 with maleic acid anhydride at 200° C for 3 hours, 10 parts ethyleneglycol dimethacrylate, 10 parts ethyleneglycol monomethacrylate, 80 parts titania, 1 part cobalt naphthenate containing 6% cobalt and 2.5 parts methylethylketone peroxide. The coating thus applied was cured at room temperature. The coated film required 1 hour to be tack free and 3 hours to be completely cured.

The cured film had a thickness of 150 microns and showed excellent physical properties including a pencil hardness of 2H, a Dupont's impact test value of above 50 cm and an Ericksen test value of 7 mm. The film withstood a cross cut test with satisfactory results. The film was subjected to a corrosion test, and after a lapse of 300 hours the same did not show any objectionable change. Water resistance test was made of the film of coating at 40° C over a time length of 400 hours with satisfactory results. No objectionable changes were noted in the film upon soaking of the same in 5% NaOH solution at room temperature for a duration of 24 hours.

COMPARATIVE EXAMPLE 6

A steel plate was coated by 10 mil applicator with the same mixture as in Inventive Example 15 except for the use of methylmethacrylate instead of the ethyleneglycol dimethacrylate and ethyleneglycol monomethacrylate. The coating thus applied was cured at room temperature. The coated film required 30 hours to be tack free and 72 hours to be completely cured. The cured film had a thickness of 110 microns and showed pencil hardness of B, a Dupont's impact test value of 20 cm and an Ericksen test value of 3 mm, and could not withstand a cross cut test. A corrosion test, water resistance test and alkaline test was made of the film of coating with unsatisfactory results.

COMPARATIVE EXAMPLE 7

A steel plate was coated by 10 mil applicator with the same mixture as in Inventive Example 15 except for the use of maleinized liquid polybutadiene having an acid value of 55 prepared by the reaction of liquid polybutadiene having 80% cis-1,4-bonds, 20% trans-1,4-bonds and a number average molecular weight of 1750 with maleic acid anhydride at 200° C for 3 hours instead of the maleinized liquid polybutadiene. The coating thus applied was cured at room temperature. However, the film was not cured even after a lapse of 24 hours.

INVENTIVE EXAMPLE 16

A steel plate was coated by 10 mil applicator with a mixture consisting of 70 parts maleinized liquid polybutadiene having an acid value of 10 prepared by the addition of maleic acid anhydride to liquid polybutadiene having 73% 1,2-bonds and a number average molecular weight of 3,600 in the same procedure as in Inventive Example 15, 10 parts trimethylolpropane trimethacrylate, 20 parts diethyleneglycol monomethacrylate, 80 parts titania, 1 part cobalt naphthenate containing 6% cobalt and 2.5 parts methylethylketone peroxide. The coating thus applied was cured at room temperature. The coated film required 1.5 hours to be tack free and 2.5 hours to be completely cured. The cured film had a thickness of 130 microns and showed excellent physical properties including a pencil hardness of 4H, a Dupont's impact test value of above 50 cm and an Ericksen test value of 8 mm. The film withstood a cross cut test with satisfactory results.

INVENTIVE EXAMPLE 17

A steel plate was coated by 10 mil applicator with a mixture consisting of 70 parts maleinized liquid polybutadiene having an acid value of 70 prepared by the addition of maleic acid anhydride to liquid polybutadiene having 58% 1,2-bonds and a number average molecular weight of 790 in the same procedure as in Inventive Example 15, 10 parts ethyleneglycol diacrylate, 20 parts ethyleneglycol monoacrylate, 80 parts titania, 1 part cobalt octylate containing 6% cobalt and 3 parts cyclohexanone peroxede. The coating thus applied was cured at room temperature. The coated film required 3 hours to be tack free and 5 hours to be completely cured. The cured film had a thickness of 130 microns and showed excellent physical properties including a pencil hardness of H and a Dupont's impact test value of 30 cm. The film withstood a cross cut test with satisfactory results.

INVENTIVE EXAMPLE 18

A steel plate was coated by 10 mil applicator with a mixture consisting of 70 parts maleinized liquid polybutadiene having an acid value of 54 prepared by the addition of maleic acid anhydride to liquid polybutadiene having 60% 1,2-bonds and a number average molecular weight of 1020 in the same procedure as in Inventive Example 15, 15 parts triethyleneglycol dimethacrylate, 15 parts diethyleneglycol monomethacrylate, 80 parts titania, 1 part cobalt naphthenate containing 6% cobalt and 2.5 parts methylethylketone peroxide. The coating thus applied was cured at room temperature. The coated film required 1 hour to be tack free and 3 hours to be completely cured.

The cured film had a thickness of 130 microns and showed excellent physical properties including a pencil hardness of 2H and a Dupont's impact test value of 40 cm. The film withstood a cross cut test with satisfactory results.

COMPARATIVE EXAMPLE 8

A steel plate was coated by 10 mil applicator with a mixture consisting of 70 parts of the same maleinized liquid polybutadiene as used in Inventive Example 18, 30 parts triethyleneglycol dimethacrylate, 80 parts titania, 1 part cobalt naphthenate containing 6% cobalt and 2.5 parts methylethylketone peroxide. The coating thus applied was cured at room temperature. The coated film required 12 hours to be tack free and 24 hours to be completely cured.

INVENTIVE EXAMPLE 19

A steel plate was coated by 10 mil applicator with a mixture consisting of 70 parts maleinized liquid polybutadiene having an acid value of 20 prepared by the addition of maleic acid anhydride to liquid polybutadiene having 73% 1,2-bonds and a number average molecular weight of 3600 in the same procedure as in Inventive Example 15, 20 parts diethyleneglycol dimethacrylate, 30 parts trimethylolpropane monomethacrylate, 80 parts titania, 1 part cobalt naphthenate containing 6% cobalt and 2.5 parts methylketone peroxide. The coating thus applied was cured at room temperature. The coated film required 0.5 hour to be tack free and 2 hours to be completely cured. The cured film had a thickness of 50 microns and showed excellent physical properties including a pencil hardness of 4H, a Dupont's impact test value of above 50 cm and an Ericksen test value of 8.5 mm. The film withstood a cross cut test with satisfactory results. The film was subjected to water resistance test and after a lapse of 300 hours at ordinary temperature no objectionable changes were noted in the film.

INVENTIVE EXAMPLE 20

A steel plate was coated by 10 mil applicator with a mixture consisting of 60 parts maleinized liquid polybutadiene having an acid value of 80 prepared by the addition of maleinic acid anhydride to liquid polybutadiene having 60% 1,2-bonds and a number average molecular weight of 1020 in the same procedure as in Inventive Example 15, 20 parts trimethylolpropane triacrylate, 20 parts triethyleneglycol monomethacrylate, 80 parts titania, 1 part cobalt naphthenate containing 6% cobalt and 3 parts methylethylketone peroxide.

The coating thus applied was cured at room temperature. The coated film required 1 hour to be tack free and 2.5 hours to be completely cured. The cured film had a thickness of 150 microns and showed excellent physical properties including a pencil hardness of 3H, a Dupont's impact test value of 50 cm and an Ericksen test value of 7 mm.

INVENTIVE EXAMPLE 21

A steel plate was coated by 10 mil applicator with a mixture consisting of 70 parts maleinized liquid polybutadiene having an acid value of 60 prepared by the addition of maleic acid anhydride to liquid polybutadiene having 90% 1,2-bonds and a number average molecular weight of 2000 in the same procedure as in Inventive Example 15, 20 parts diethyleneglycol diacrylate, 10 parts triethyleneglycol monoacrylate, 50 parts titania, 1 part cobalt naphthenate containing 6% cobalt and 2 parts methylethylketone peroxide. The coating thus applied was cured at room temperature. The coated film required 1 hour to be tack free and 2.5 hours to be completely cured. The film of coating with toughness was obtained.

INVENTIVE EXAMPLE 22

Maleinized liquid polybutadiene having an acid value of 40 was prepared by the addition of maleic acid anhydride to liquid polybutadiene having 68% 1,2-bonds and a number average molecular weight of 2500 in the same procedure as in Inventive Example 15.

A steel plate was coated to a thickness of 1 mm with a mixture consisting of 80 parts esterified polybutadiene prepared by the esterification of said maleinized liquid polybutadiene with ethyleneglycol monobutyl ether in a conventional manner, 50 parts triethyleneglycol diacrylate, 30 parts trimethylolpropane monoacrylate, 100 parts titania, 3 parts cobalt naphthenate containing 6% cobalt and 5 parts methylethylketone peroxide. The resulting relatively thick film of coating was rapidly cured at room temperature and its surface required only 2 hours to be completely cured.

INVENTIVE EXAMPLES 23 – 27 and COMPARATIVE EXAMPLES 9 and 10

A steel plate treated with zinc phosphate was coated by 10 mil applicator with a mixture consisting of 70 parts maleinized liquid polybutadiene having an acid value of 80 prepared by the addition of maleic acid anhydride to liquid polybutadiene having 65% 1,2-bonds and a number average molecular weight of 2000 in the same procedure as in Inventive Example 15, 80 parts titania, 5 parts strontium chromate, 5 parts cobalt naphthenate containing 6% cobalt, 5 parts methylethylketone peroxide, ethyleneglycol dimethacrylate and ethyleneglycol monomethacrylate, the added amounts of the ethyleneglycol dimethacrylate and the ethyleneglycol monomethacrylate being varied as shown in Table 2. The coating thus applied was cured at room temperature. The results of these tests are given in Table 2.

It will be seen from Table 2 that less ethyleneglycol dimethacrylate results in reduced hardness of the film and reduced chemicals-resistance, and that less ethyleneglycol monomethacrylate results in retarded curing rate.

Table 1

|  | Amounts of ethyleneglycol dimethacrylate (parts) | Amounts of tetrahydrofurfuryl alcohol (parts) | Time (hrs) To be tack-free | Time (hrs) To cure | Pencil hardness | *1 Alkali-resistance | *2 Water-resistance | Salt spraying test (300 hours) |
|---|---|---|---|---|---|---|---|---|
| Comparative Example 4 | 0 | 30 | 2 | 4 | HB | Bad | Bad | Poor |
| Inventive Example 10 | 5 | 25 | 2 | 4 | H | Poor | Poor | Fair |
| Inventive Example 11 | 10 | 20 | 1.5 | 3 | 2H | Fair | Poor | Fair |
| Inventive Example 12 | 15 | 15 | 1 | 2 | 2H | Fair | Fair | Excellent |
| Inventive Example 13 | 20 | 10 | 2 | 4 | 2H | Fair | Fair | Excellent |
| Inventive Example 14 | 25 | 5 | 3 | 6 | 3H | Excellent | Fair | Fair |
| Comparative Example 5 | 30 | 0 | 78 | 24 | 4H | Excellent | Fair | Poor |

Note:
Excellent: The film showed no signs of objectionable change.
Fair: The film showed no signs of objectionable change.
Poor: The film was slightly damaged.
Bad: The film was largely damaged.
*1 The film was immersed in 5% NaOH soluton for 24 hours.
*2 The film was immersed in purified water of 40° C for 500 hours.

Table 2

|  | Amounts of ethyleneglycol dimethacrylate (parts) | Amounts of ethyleneglycol monomethacrylate (parts) | Time (hrs) To be tack-free | Time (hrs) To cure | Pencil hardness | *1 Alkali-resistance | *2 Water-resistance | Salt spraying test 300 hours |
|---|---|---|---|---|---|---|---|---|
| Comparative Example 9 | 0 | 30 | 2 | 3 | H | Bad | Bad | Poor |
| Inventive Example 23 | 5 | 25 | 2 | 3 | H | Poor | Poor | Fair |
| Inventive Example 24 | 10 | 20 | 3 | 4 | 2H | Fair | Poor | Fair |
| Inventive Example 25 | 15 | 15 | 3 | 4 | 2H | Fair | Fair | Excellent |
| Inventive Example 26 | 20 | 10 | 3 | 4 | 2H | Excellent | Fair | Excellent |
| Inventive Example 27 | 25 | 5 | 4 | 6 | 2H | Excellent | Fair | Fair |

Table 2-continued

| | Amounts of ethyleneglycol dimethacrylate (parts) | Amounts of ethyleneglycol monomethacrylate (parts) | Time (hrs) To be tack-free | Time (hrs) To cure | Pencil hardness | *1 Alkali-resistance | *2 Water-resistance | Salt spraying test 300 hours |
|---|---|---|---|---|---|---|---|---|
| Comparative Example 10 | 30 | 0 | 78 | 24 | 4H | Excellent | Fair | Poor |

Note:
Excellent: The film showed no signs of objectionable change.
Fair: The film showed no signs of objectionable change.
Poor: The film was slightly damaged.
Bad: The film was largely damaged.
*1 The film was immersed in 5% NaOH for 24 hours.
*2 The film was immersed in purified water of 40° C for 500 hours.

What is claimed is:

1. A coating composition comprising in combination:
   (a) the reaction product of a butadiene polymer having a number average molecular weight of 500 - 10,000, more than 50% of the butadiene units in the polymer chain being linked in 1,2-bonds, and 0.02 - 0.3 mol of an unsaturated dicarboxylic acid or its anhydride per 100 grams of said polymer;
   (b) a poly-(metha)-acrylate of a polyhydric alcohol added in amounts of 5 - 100 weight parts per 100 weight parts of said component (a);
   (c) at least one compound of the class consisting of compounds having an allyl ether group, compounds having a tetrahydrofurfuryl group and compounds having a benzyl ether group, said compound being added in amounts of 1 - 50 weight parts per 100 weight parts of said component (a); and
   a radical generator added in amounts of 0.1 - 15 weight parts per 100 weight parts of said component (a).

2. A coating composition as claimed in claim 1 wherein said component (a) is esterified.

3. A coating composition as claimed in claim 1 wherein said polyfunctional ester compound is selected from the group consisting of ethyleneglycol diacrylate, ethyleneglycol dimethacrylate, diethyleneglycol diacrylate, diethyleneglycol dimethacrylate, triethyleneglycol diacrylate, triethyleneglycol dimethacrylate and trimethylolpropane trimethacrylate.

4. A coating composition as claimed in claim 1 wherein said compound having an allyl ether group has the general formula $$R_1 - O - CH_2 - CH = CH_2$$

where $R_1$ is an organic residue having a carbon number of 1 - 20.

5. A coating composition as claimed in claim 1 wherein said compound having a tetrahydrofurfuryl group has the general formula

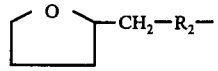

where $R_2$ is a hydroxyl group or an organic residue having a carbon number of 1 - 20.

6. A coating composition as claimed in claim 1 wherein said compound having a benzyl ether group has the general formula $$Ar - CHR_3 - O - R_4$$

where Ar is an aromatic nucleus, and $R_3$ and $R_4$ both are an organic residue having a carbon number of 1 - 20.

7. A coating composition comprising in combination:
   (a) the reaction product of a butadiene polymer having a number average molecular weight of 500 - 10,000, more than 50% of the butadiene units in the polymer chain being linked in 1,2-bonds, and 0.02 - 0.3 mol of an unsaturated dicarboxylic acid or its anhydride per 100 grams of said polymer;
   (b) a poly-(metha)-acrylate of a polyhydric alcohol added in amounts of 5 - 100 weight parts per 100 weight parts of said component (a);
   (c) a mono-(metha)-acrylate of a polyhydric alcohol added in amounts of 5 - 100 weight parts per 100 weight parts of said component (a); and
   (d) a radical generator added in amounts of 0.1 - 15 weight parts per 100 weight parts of said component (a).

8. A coating composition as claimed in claim 1 which further includes pigments added in amounts of 50 - 400 weight parts per 100 weight parts of said component (a).

9. A coating composition as claimed in claim 1 wherein said radical generator is a ketone peroxide selected from the group consisting of methylethylketone peroxide, cyclohexanone peroxide and acetyl-acetone peroxide.

10. A coating composition as claimed in claim 9 wherein said ketone peroxide is mixed with a heavy metal salt of organic carboxylic acid.

* * * * *